United States Patent [19]
Yang

[11] Patent Number: 6,069,877
[45] Date of Patent: May 30, 2000

[54] DUPLICATE DEVICE DETECTION SYSTEM

[75] Inventor: Ming-Chung Yang, Copley, Ohio

[73] Assignee: Telxon Corporation, Akron, Ohio

[21] Appl. No.: 08/731,399

[22] Filed: Oct. 18, 1996

[51] Int. Cl.$^7$ .................................................. H04B 7/00
[52] U.S. Cl. ........................................ 370/252; 455/435
[58] Field of Search ................................... 370/252, 241, 370/242, 310, 328, 329, 338, 522; 455/67.1, 517, 433, 435, 434

[56] References Cited

U.S. PATENT DOCUMENTS

| | | |
|---|---|---|
| 4,955,049 | 9/1990 | Ghisler . |
| 5,301,357 | 4/1994 | Thompson ............................. 455/435 |
| 5,309,501 | 5/1994 | Kozik et al. . |
| 5,483,465 | 1/1996 | Grube et al. . |
| 5,483,596 | 1/1996 | Rosenow et al. . |
| 5,555,192 | 9/1996 | Grube et al. . |
| 5,649,301 | 7/1997 | Yabusaki et al. ....................... 455/433 |
| 5,655,004 | 8/1997 | Holbrook . |

*Primary Examiner*—Huy D. Vu
*Attorney, Agent, or Firm*—Amin, Eschweiler & Turocy, LLP

[57] ABSTRACT

A network communication system with duplicate device detection in which a mobile communication unit, attempting to register to a communication network with a duplicate identification code as that of another mobile communication unit already registered, is detected and refused registration to the network. As a result, the mobile communication unit already registered to the network is not deregistered. Furthermore, the network communication system is not locked-up due to the existence within the system of two mobile communication units with the same identification code, thereby preserving data integrity within system and reducing potential downtime of the system due to lock-up.

3 Claims, 8 Drawing Sheets

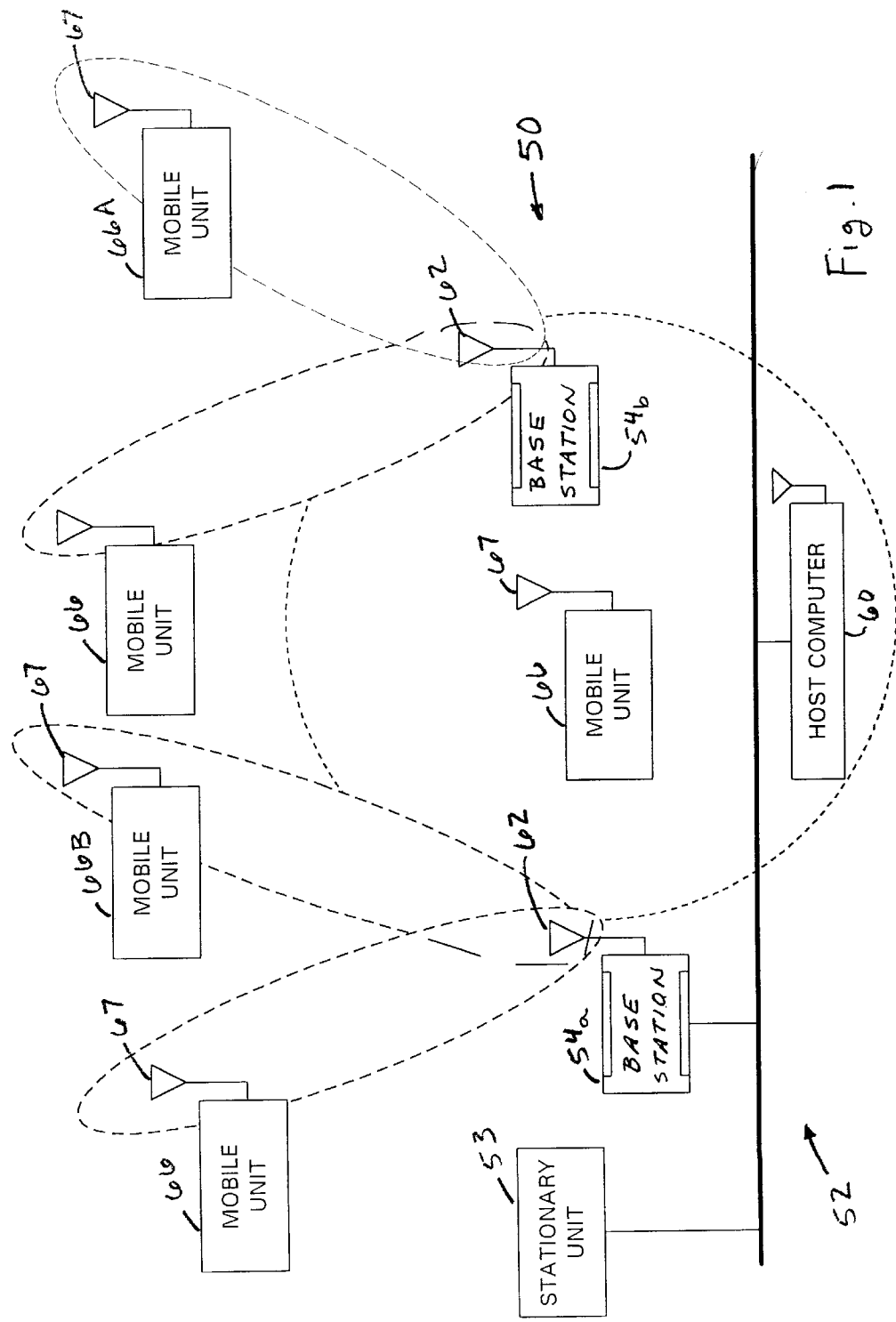

340

| MOBILE COMMUNICATION UNIT DEVICE ID |
| --- |
| 0001 |
| 0002 |
| 0003 |
| 0004 |
| 0005 |
| 0006 |
| ⊛ |
| ⊛ |
| ⊛ |
| ⊛ |
| m |

Fig. 7

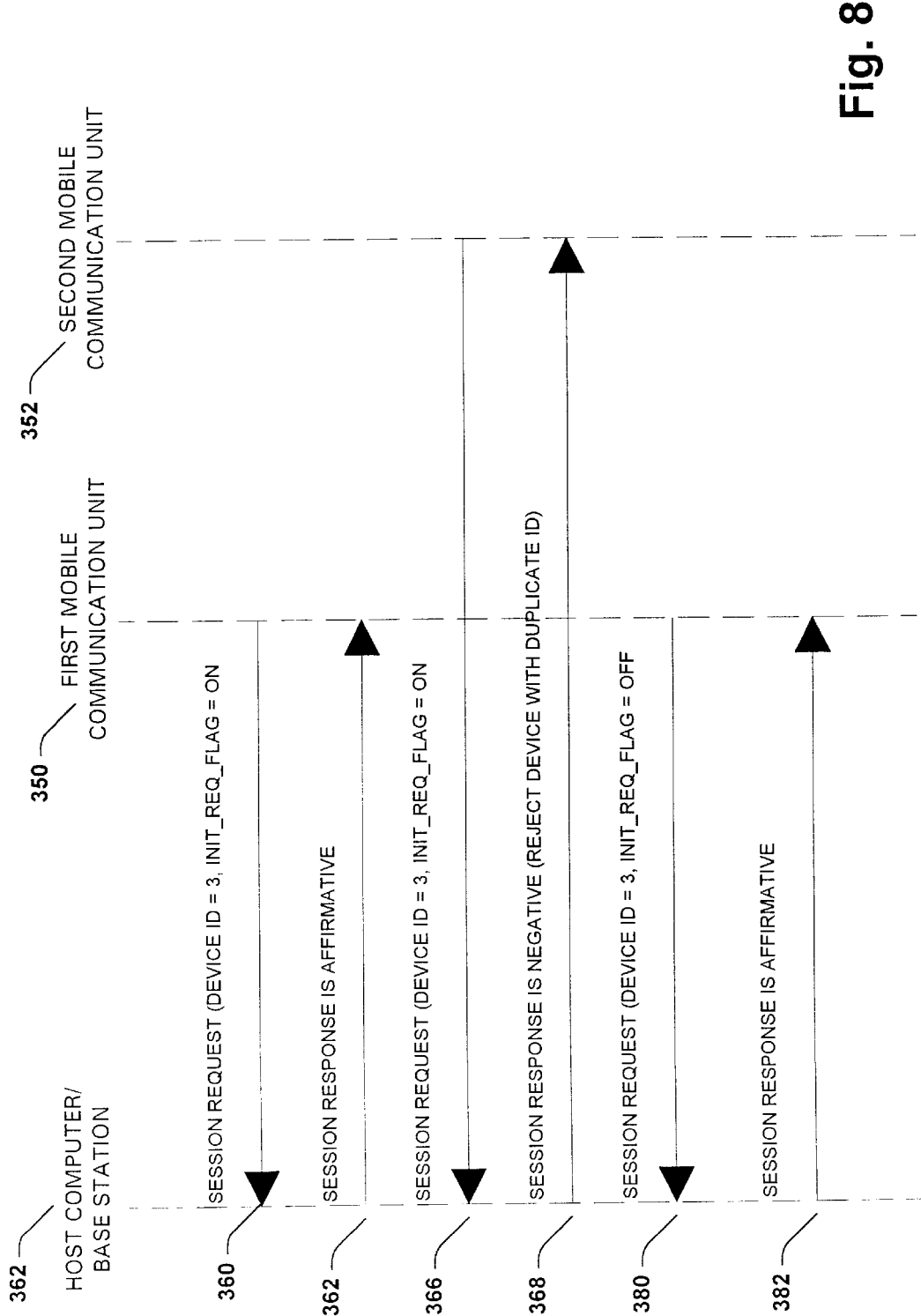

DUPLICATE DEVICE DETECTION SYSTEM

TECHNICAL FIELD OF THE INVENTION

The present invention relates generally to network communication systems, such as local area networks (LANs), and more particularly to network cellular communication systems which are accessed by one or more mobile communication units.

BACKGROUND OF THE INVENTION

In recent years, the use of communication systems having wireless mobile communication units which communicate using an optical or radio link with a hardwired network, such as a local area network (LAN), has become quite widespread. Retail stores and warehouses, for example, may use such systems to track inventory and replenish stock. Employees may enter inventory information using a hand held or portable communication unit which can be carried through the store or warehouse. In manufacturing facilities, such systems are useful for tracking parts, completed products and defects. In a medical environment, these systems can reduce the time needed to fill out forms and eliminate inaccuracies by allowing medical personnel to transmit data directly from a mobile communication unit carried by the medical personnel.

A conventional communication system generally includes a number of fixed base stations (i.e., access points) interconnected by a cable medium to form a hardwired backbone network. The network medium may be a twisted pair cable, shielded coaxial cable or fiber optic lines, for example. Each base station has a service area or cell surrounding the base station within which it has the ability to transmit and to receive relatively error-free data from a mobile communication unit within the area. In many instances, the cell is not circular because physical objects within the cell may partially block data signals creating "dead spots" within the area surrounding the base station. Also, machinery located in the vicinity of the base station may generate excessive noise levels that degrade the quality of transmissions between the base stations and the mobile communication units.

In such a network, a mobile communication unit must initially register itself with a base station and then attempt to begin a session with a host computer whereby the host allows communication to occur between itself and the particular mobile communication unit. More particularly, when a mobile communication unit is powered up, it "registers" with a base station. However, as the location of this mobile communication unit changes, the mobile communication unit may register with another base station, thereby resulting in a deregistration with the previous base station. Furthermore, deregistration will sometimes occur if there is no communication between the mobile communication unit and its corresponding base station within a predetermined period of time. Thus, in such communication systems, mobile communication units register and deregister frequently as the mobile communication units are moved about.

As mentioned above, each mobile communication unit within the communication system must also begin and maintain a session with the host computer (or other device which provides application or information based services) once it has registered with a base station. A session is typically only initiated once at start up by each mobile communication unit and is active unit such time as the mobile communication unit ends the session regardless of the number of registrations and deregistrations which may have taken place with respect to base stations during this period. Each mobile communication unit within the communication system has a respective identification code (ID), which allows the host computer or other device on the backbone handling session requests to recognize and distinguish each mobile communication unit. Occasionally, however, an error will occur where the host computer receives a request for a new session whereby the ID associated with the new session request is the same as an ID for an already established session. Similarly, the same type of error could also occur with respect to the mobile communication unit registering with the base stations. The error may be the result of an improperly programmed mobile communication unit wherein the ID was duplicated as a result of the same mobile communication unit accidently re-attempting to begin a new session with the host computer, or may be the result of the ID of the mobile communication unit being corrupted during transmission to the base station or host computer, for example.

This type of error may result in the original mobile communication unit being dumped from the communication system or cause the communication system to lock-up. As a result, data integrity of the original mobile communication unit to host computer session may be lost as a result of the original mobile communication unit being dumped. Furthermore, if the duplicate ID error causes the communication system to lock-up, data integrity of all mobile communication unit to host computer sessions within the communication system may be jeopardized. Accordingly, there is a strong need in the art for a duplicate device ID detection system which overcomes the aforementioned problems associated with a mobile communication unit accessing a communication system with an apparent duplicate ID. In particular, there is a strong need in the art for a system that detects and rejects a mobile communication unit which is attempting to register to a communication system (i.e., with a session request or base station registration process) with a duplicate ID so that a mobile communication unit already registered to the communication system is not deregistered or dumped, and/or the communication system does not lock-up.

SUMMARY OF THE INVENTION

The present invention provides a network communication system and method with duplicate device detection. In accordance with the invention, a mobile communication unit, attempting to register to a communication network with a duplicate identification code as that of another mobile communication unit already registered to the network, is detected and refused registration to the network. For purposes of this invention and the accompanying claims, the phrase "registered to a communication network", and the like includes, a mobile communication unit registered or registering itself with an access point or base station. Furthermore, it is to be understood that the phrase "registered to a communication network", and the like, includes the mobile communication unit being in a session or beginning a session with a host computer, base station or other device which establishes a connection for exchanging application and/or informational based communications with such device.

In a preferred embodiment, a processor determines the identification code of a mobile communication unit attempting to register to the network. The processor then compares the identification code of the mobile communication unit attempting to register to the network with the identification codes of other mobile communication units already registered to the network. If the mobile communication unit attempting to register to the network is using an identification code apparently duplicate to an identification code of a mobile communication unit already registered to the network, the processor refuses registration to the mobile communication unit attempting to register.

According to one particular aspect of the invention, a mobile communication unit for use in a network communication system includes a wireless communication device for transmitting and receiving communication within the system; and a device for building a network registration packet to be wirelessly transmitted in the system, the network registration packet indicating whether the mobile communication unit is attempting an initial request to register with the network.

According to a further aspect of the invention, a mobile communication unit for use in a network communication system includes a wireless communication means for transmitting and receiving communication within the system; and a means for building a network registration packet to be wirelessly transmitted in the system, the network registration packet indicating whether the mobile communication unit is attempting an initial request to register with the network.

Furthermore, in accordance with yet another aspect of the invention a network device coupled to a system backbone in a wireless communication system including a plurality of mobile communication units communicating over the system backbone is provided, the network device including: means for determining if a particular mobile communication unit of the plurality of mobile communication units is attempting to register to a communication network with the same apparent identification code as any mobile communication unit already registered to the communication network.

According to another aspect of the invention, a communication system with duplicate device detection includes: a plurality of mobile communication units, each having an identification code; and a network including a host computer and one or more base stations each coupled to the host computer. The base stations each include a communication device for registering one or more of the plurality of mobile communication units to the communication network and communicating information between the host computer and the one or more mobile communication units. At least one processor is provided in the communication network for determining if a particular mobile communication unit of the plurality of more mobile communication units is attempting to register to the communication network with the same apparent identification code as any mobile communication unit already registered to the communication network. The processor prevents registration to the communication network by the particular mobile communication unit which is attempting to register with an apparent duplicate identification code.

According to another aspect of the invention, a method of controlling registration of a mobile communication unit of a plurality of mobile communication units to a communication network includes the steps of: receiving a session request from the mobile communication unit; determining the identification code of the mobile communication unit; determining if there already is a session in progress with any mobile communication unit having the same apparent identification code; and refusing registration to the mobile communication unit if there already is a session in progress with the any mobile communication unit having the same apparent identification code.

More particularly, the method of controlling registration of a mobile communication unit includes the steps of: receiving a session request from a first mobile communication unit; determining the identification code of the first mobile communication unit; receiving a session request from a second mobile communication unit; determining the identification code of the second mobile communication unit; determining if the identification code of the second mobile communication unit is an apparent duplicate of the first mobile communication unit; and refusing registration to the second mobile communication unit if the first mobile communication unit has already registered to the communication network with the same identification code.

In accordance with a further aspect of the invention, a communication system with duplicate device detection of a plurality of mobile communication units each having an identification code includes: a network including a host computer and one or more base stations each coupled to the host computer, the base stations each including a communication device for registering one or more of the plurality of mobile communication units to the communication network and communicating information between the host computer and the one or more mobile communication units; and at least one processor in the communication network for determining if a particular mobile communication unit of the plurality of more mobile communication units is attempting to register to the communication network with the same apparent identification code as any mobile communication unit already registered to the communication network, and the processor preventing registration to the communication network by the particular mobile communication unit which is attempting to register with an apparent duplicate identification code.

To the accomplishment of the foregoing and related ends, the invention then comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the drawings:

FIG. 1 is a system diagram of a network communication system in accordance with the present invention;

FIG. 7 is an illustration of a table of identification codes of respective mobile communication units which is maintained by a processor according to the invention; and FIG. 8 is a flow diagram illustrating a manner in which a first mobile communication unit and a second mobile communication unit transmitting identical identification codes to either the host computer or base station attempt to register to a network and are respectively afforded registration or refused registration.

DESCRIPTION OF THE PREFERRED EMBODIMENTS

Figure 2A:
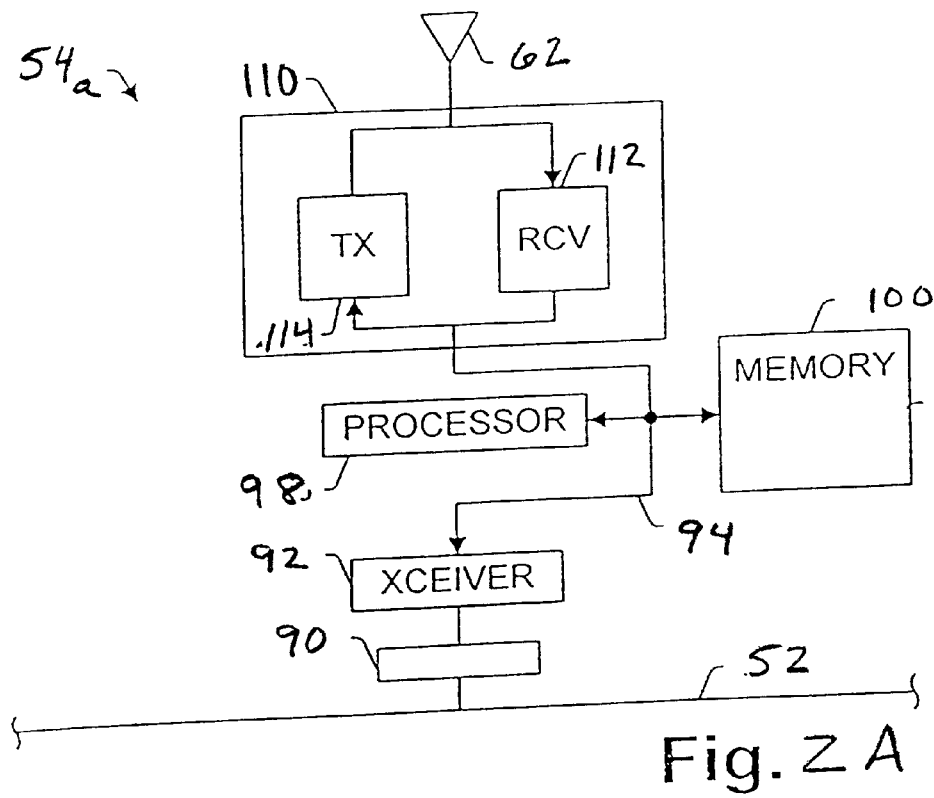
FIG. 2A is a block diagram of a hard wired base station in accordance with the present invention.

The present invention will now be described with reference to the drawings wherein like reference numerals are used to refer to like elements throughout. As mentioned above, the present invention relates to cellular communication systems which include mobile communication units that can roam from cell to cell. Such mobile communication units can be data terminals, telephones, pagers, etc. In the exemplary embodiment described hereinafter, the mobile communication unit is a mobile data terminal used to communicate data such as inventory or the like. However, it is recognized that the invention contemplates other types of mobile devices and is not intended to be limited to systems using mobile data terminals.

Referring now to FIG. 1, a cellular communication system 50 is shown in accordance with the exemplary embodiment of the present invention. The cellular communication system 50 includes a network backbone 52. The network backbone 52 may be a hardwired data communication path made of twisted pair cable, shielded coaxial cable or fiber optic cable, for example, or may be wireless or partially wireless in nature. Coupled to the network backbone 52 are a stationary communication unit 53 and several base stations 54. Only one base station $54_a$ is shown hardwired to the network backbone 52, however, it is understood that more than one hardwired base station $54_a$ may be physically connected to the network backbone 52. The base stations 54 may be hardwired to the network backbone 52 such as base stations $54_a$ or may wirelessly couple to the backbone 52 such as base station $54_b$. Each base station 54 serves as an entrance point through which wireless communications may occur with the network backbone 52. The wireless base station $54_b$ may be employed to expand the effective communication range of the cellular communication system 50. As is conventional, each wireless base station $54_b$ associates itself, typically by registration, with another base station or a host computer 60 coupled to the network backbone 52, whether hardwired or wireless, such that a link is formed between itself and other devices situated on the network backbone 52.

Each base station 54 is capable of wirelessly communicating with other devices in the communication system 50 via respective antennas commonly denoted by reference numeral 62. The antenna 62 for any particular device may be of any type suitable for use in a network cellular communication system, such as an omni-directional antenna, a yagi-type antenna, etc. A geographic cell (not shown) associated with each base station 54 defines a region of coverage in which successful wireless communications may occur. Depending on the type of antenna 62 selected and output power of the respective base station, the geographic cell may take one of several different forms and sizes. For example, the antenna 62 could be an omni-directional antenna if a generally spherical cell area of coverage is desired. A directed yagi-type antenna could be used as the antenna 62 for a more directed elliptical cell area of coverage.

The cellular communication system 50 also includes one or more mobile communication units 66. The mobile communication units 66 each include an antenna 67 for wirelessly communicating with other devices. Each mobile communication unit 66 communicates with devices on the network backbone 52 via a selected base station 54 and/or with other mobile communication units, and/or directly with the host computer 60 if within cell range of the host computer 60. Upon roaming from one cell to another, the mobile communication unit 66 is configured to associate itself with a new base station 54 or directly with the host computer 60 if within range. A mobile communication unit 66 registers with a particular base station which provides the particular mobile communications unit with wireless access to the network backbone 52. The manner in which each of the mobile communication units are registered with a particular base station 54 is discussed in more detail below in connection with FIG. 4.

As will be presented in greater detail below, the network cellular communication system 50 of the present invention is able to detect a second mobile communication unit attempting to register to the network backbone 52 with the same apparent identification code as that of a first mobile communication unit already registered to the network, and refuse the second mobile communication unit registration. For example, still referring to FIG. 1, mobile communication unit 66A is already registered to the network backbone 52 under an identification code (e.g., ID=5067). If a second mobile communication unit 66B attempts to register to the network with the same apparent identification code (e.g., ID=5067) as the first mobile communication unit 66A, a processor determines that units with duplicate IDs exist in the system. The processor may be part of the host computer 60, a base station 54 or possibly even a mobile communication unit 66. The processor, as discussed in significantly greater detail below, will refuse registration of the second mobile communication unit 66B to the network backbone 52. As a result, the first mobile communication unit 66A is not deregistered or dumped from the communication system 50, and/or the communication system 50 is prevented from locking-up due to the existence within the communication system 50 of two mobile communication units 66 having the same apparent identification code.

FIG. 2A is a block diagram representative of each hardwired base station $54_a$. Each hardwired base station $54_a$ is connected to the network backbone 52 via a connector 90 such as a DB-9 or RJ-45 connector. The connector 90 is connected to the network backbone 52 at one end and to a network adapter transceiver 92 included in the base station $54_a$ at the other end. The network adapter transceiver 92 is configured according to conventional adapter transceiver techniques to allow the base station $54_a$ to communicate over the network backbone 52. The network adapter transceiver 92 is also connected to an internal bus 94 included within the base station $54_a$. The base station $54_a$ further includes a processor 98 connected to the bus 94 for controlling and carrying out the operations of the base station $54_a$. The processor 98 may include any of a variety of different microprocessors, such as the Motorola 68360 or Intel 80486 microprocessors. It is understood that any suitable processor capable of carrying out the herein described functions of the base stations $54_a$ may be used and falls within the scope of this invention.

The base station 54$_a$ also includes a memory 100 connected to the bus 94. The memory 100 stores program code executed by the processor 98 for controlling the other elements within the base station 54$_a$ to carry out the functions described herein. It will be readily apparent to a person having ordinary skill in the art of microprocessor programming how to program the processor 98 to carry out the operations described herein using conventional programming techniques based on the flowcharts and descriptions provided herein. Accordingly, additional detail as to the specific program code has been omitted. The memory 100 also serves to buffer packets of information such as those received over the network backbone 52 or those transmitted to or received from the mobile communication units 66 or wireless base stations 54$_b$. Furthermore, the memory 100 may store tables relating to which of the mobile communication units 66 are registered to the network backbone 52 and/or the identification codes of the mobile communication units 66.

Also connected to the bus 94 is a radio frequency (RF) section 110 included in the base station 54$_a$. The RF section 110 includes the aforementioned antenna 62 for receiving radio signals from and transmitting radio signals to mobile communication units 66 and wireless base stations 54$_b$ (FIG. 2B) within the cell area of the base station 54$_a$. Information transmitted from a mobile communication unit 66 or a wireless base station 54$_b$ is received via the antenna 62 and is processed by an RF receiver 112 which is connected to the bus 94 and demodulates and decodes the signal and converts the signal to a digital signal having a packet format as discussed below in connection with FIGS. 6A and 6B. The processor 98 controls an RF transmitter 114 included in the RF section 110, the RF transmitter also being connected to the bus 94. The processor 98 causes the RF transmitter 114 to modulate and transmit an RF signal which in turn carries the information packet (FIGS. 6A and 6B) to the appropriate mobile communication unit 66 or wireless base station 54$_b$.

The processor 98 in the base station 54$_a$ inserts source routing information into the source routing field of the packet that is received from the mobile communication unit 66, if needed. Thereafter, the processor 98 stores the packet in the memory 100 until such time as the base station 54$_a$ is able to transmit the information packet onto the network backbone 52 via the network adapter transceiver 92 and connector 90.

Figure 2B:
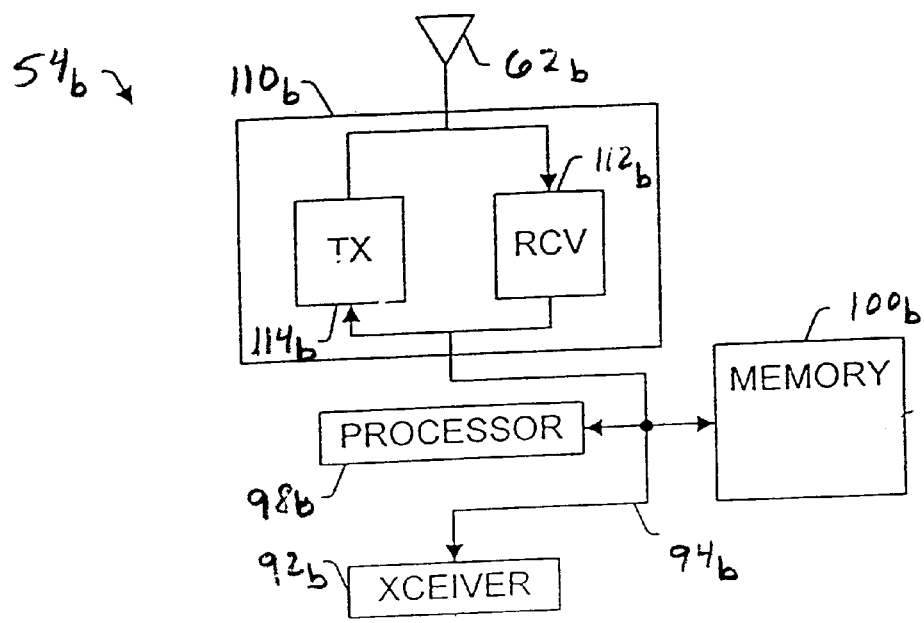
FIG. 2B is a block diagram of a wireless base station in accordance with the present invention.

FIG. 2B is a block diagram representative of each wireless base station 54$_b$ in the system 50. For the most part, the construction and operation of the components within the wireless base station 54$_b$ are identical to those described with respect to the base stations 54$_a$. Hence, similar components are denoted simply by the addition of a [b]. For example, the processor 98 in the base station 54$_a$ is equivalent to the processor 98 in the wireless base station 54$_b$. However, the wireless base station 54$_b$ is not connected directly to the network backbone 52 and therefore does not include a network transceiver 92 or connector 90 as in each base station 54$_a$. Rather, the wireless base station 54$_b$ communicates with mobile communication units 66 registered thereto and with the particular base station with which the wireless base station 54$_b$ is associated with via the RF section 110$_b$. Operations of the two base stations 54$_a$ and 54$_b$ are primarily the same with the exception of the particular procedures describe herein. As mentioned above, the wireless base stations 54$_b$ function to extend the relative cell coverage of a given base station 54$_a$, and serve primarily to relay information between the base stations 54$_a$ connected to the network backbone 52 and the mobile communication units 66.

Figure 2C:
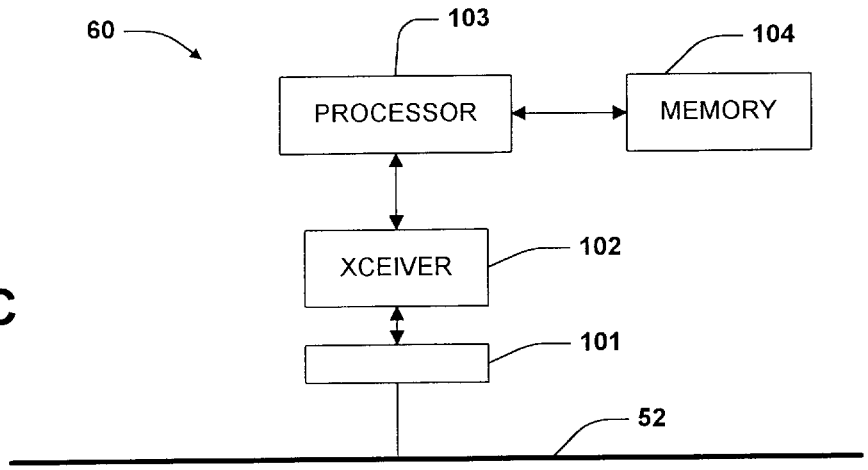
FIG. 2C is a block diagram of a host computer in accordance with the present invention.

FIG. 2C is a block diagram representative of the host computer 60 of the present invention. Although operations performed by the host computer 60 are conventionally different than the operations of a base station 54, the hardware components are similar to those hardware components described with respect to base station 54$_a$ in FIG. 2A. Hence, the function and interconnection among the hardware components will not be described again in detail. Rather, as shown in FIG. 2C, similar to base station 54$_a$, the host computer includes a backbone connector 101, a transceiver 102, a processor 103 and a memory 104. Unlike the base stations 54, however, the host computer 60 of this particular embodiment does not include an RF section 110. Thus, in order for the host computer 60 to communicate with any mobile communication unit 66, the host computer 60 must route all such communication over the backbone 52 and through one of the base stations 54. Similarly, for a mobile communication unit 66 to communicate with the host computer 60, the mobile communication unit 66 must first access the network backbone 52 through one of the existing base stations 54 which will then ensure the communication is properly delivered to the host computer 60. The host computer serves as a central unit where large operational based and application based software programs are stored and executed in order to provide the necessary functions which the communication system 50 was installed to perform.

Figure 3:
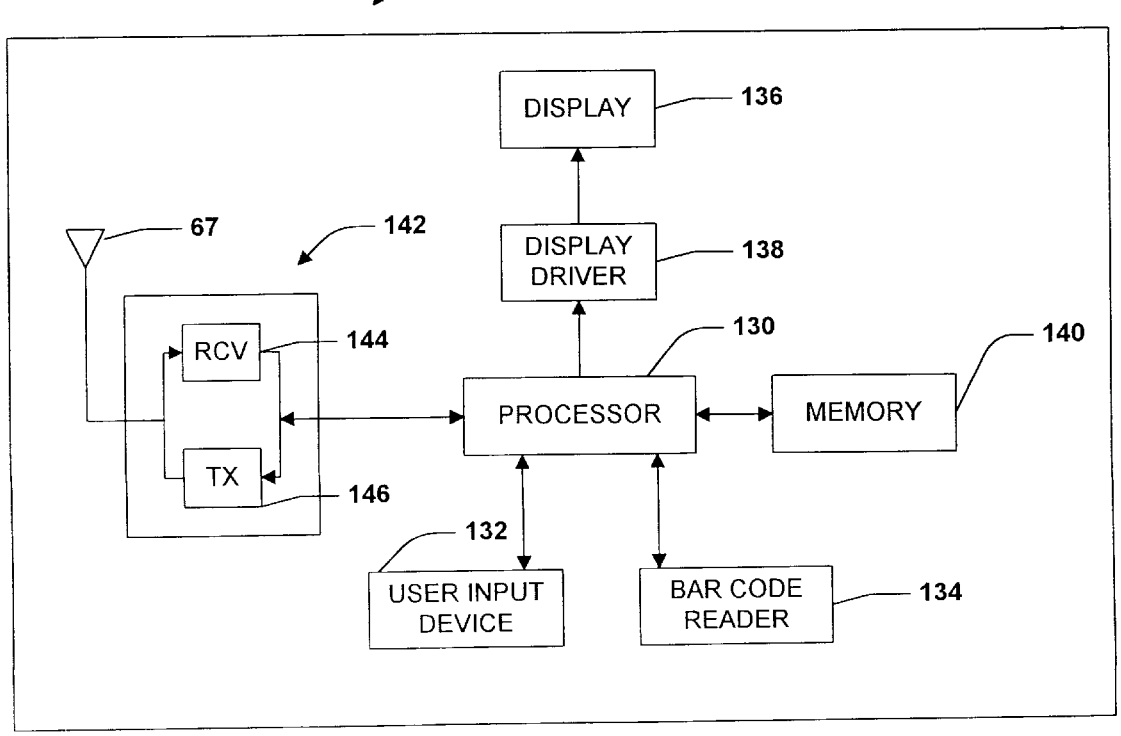
FIG. 3 is a block diagram of a mobile communication unit in accordance with the present invention.

FIG. 3 is a block diagram representing the basic structure of each mobile communication unit 66 according to the exemplary embodiment. Each mobile communication unit 66 includes a processor 130 which can be programmed to control and operate the various components within the mobile communication unit 66 in order to carry out the various functions described herein. The processor 130 has coupled thereto a user input device 132 which allows a user to input data to be communicated to the network backbone 52 such as inventory data, patient information, etc. This information may be sent to the host computer 60 which serves as a central data location, for example, or to a cash register connected to the network backbone 52, as another example, for providing price information. The input device 132 can include such items as a keypad, touch sensitive display, etc. The mobile communication unit 66 also may include a bar code scanner 134 coupled to the processor 130 serving as another form of data input. A display 136 is connected to and controlled by the processor 130 via a display driver circuit 138. The display 136 serves as a means for displaying information stored within the mobile communication unit 66 and/or received over the network backbone 52 via a base station 54. The display 136 can be a flat panel liquid crystal display with alphanumeric capabilities, for example, or any other type of display as will be appreciated.

A memory 140 is included in each mobile communication unit 66 for storing program code executed by the processor 130 for carrying out the functions described herein. The actual code for performing such functions could be easily programmed by a person having ordinary skill in the art of microprocessor programming in any of a number of conventional programming languages based on the disclosure herein. Consequently, further detail as to the particular code has been omitted for sake of brevity. The memory 140 also serves as a storage medium for storing information packets received from or intended to be transmitted to a base station 54 as discussed herein. Furthermore, the memory 140 stores an identification code which is used to designate and distinguish the mobile communication unit 66 from the other mobile communication units 66 registered to the network backbone 52.

Each mobile communication unit 66 also includes its own RF section 142 connected to the processor 130. The RF section 142 includes an RF receiver which receives the RF transmissions from a base station 54 via an antenna 67 and demodulates the signal to obtain digital information modulated therein. The RF section 144 also includes an RF transmitter 146. In the event the mobile communication unit 66 is to transmit information to the network backbone 52 in response to an operator input at input device 132, for example, the processor 130 forms within the memory 140 an information packet including data together with a source address (i.e., the address of the particular mobile communication unit 66 sending the information) and a destination address (e.g., the host computer 60 or other network device). The information packet is then delivered to the RF transmitter 146 which transmits an RF signal with the information packet modulated thereon via the antenna 67 to the base station 54 with which the mobile communication unit 66 is registered.

Figure 4A:
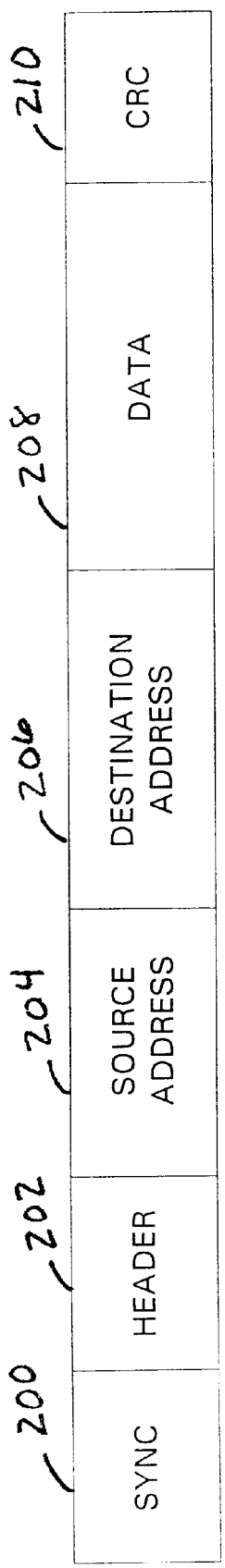
FIG. 4A is a schematic diagram representing an exemplary format for information packets which are communicated between devices in the cellular communication system in accordance with the present invention.
Figure 4B:
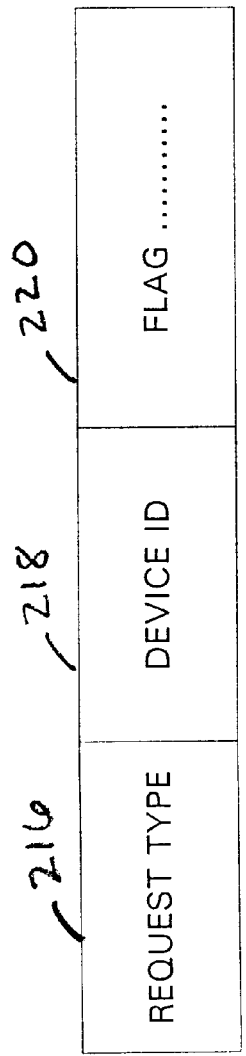
FIG. 4B is a schematic diagram representing the information found in a data field of the information packet of FIG. 4A.

Referring briefly to FIGS. 4A and 4B, an exemplary format for packets sent between devices in the system 50 is shown. Each packet includes a number of fields such as a synchronization field 200, a header field 202, a source address field 204, a destination address field 206, a data field 208, and an error correcting field (CRC) 210, for example. The synchronization field 200 includes synchronizing bits which allow a device receiving the packet an opportunity to "sync" to the packet as is conventional. The header field 202 follows the synchronization field 200 and includes information such as the length and type of the packet. For example, the header field 202 may indicate whether the packet is a type which requires a response from the receiving device. The source address field 204 follows the header field and includes an address of the device from which the packet originated. Following the source address field 204, the packet includes a destination address field 206 which holds the address of the device to which the packet is ultimately destined. The data field 208 in the packet includes various information (see FIG. 4B) intended to be communicated to the receiving device. The packet ends with a cyclical redundancy code (CRC) field 210 which serves as an error correcting field according to the conventional techniques such that a receiving device can determine if it has properly received the packet.

FIG. 4B illustrates in greater detail the information contained in the data field 208 of packets transmitted from mobile communication units 66 to base stations 54. The data field 208, includes a request type field 216 which identifies the type of request being made by the mobile communication device 66 to the destination device. For example, the request type field 216 may indicate that an initial session request is being made, or a final session request is being made, etc. The data field 208 also includes a device ID field 218 which contains an identification code for the particular mobile communication unit 66. The identification code identifies and distinguishes the mobile communication unit 66 to the network backbone 52 with respect to other mobile communication units 66 within the communication system 50. The data field 208 further includes a flag field 220 which is indicative of the current status of the mobile communication unit 66 with respect to the network backbone 52. For example, setting the flag field to "ON" may be used to indicate that this is the first time the mobile communication unit 66 is registering to the network backbone 52. Also, setting the flag field 220 to "OFF" can be used to indicate that this is not the first time the mobile communication unit 66 is registering to the network backbone 52.

Figure 5:
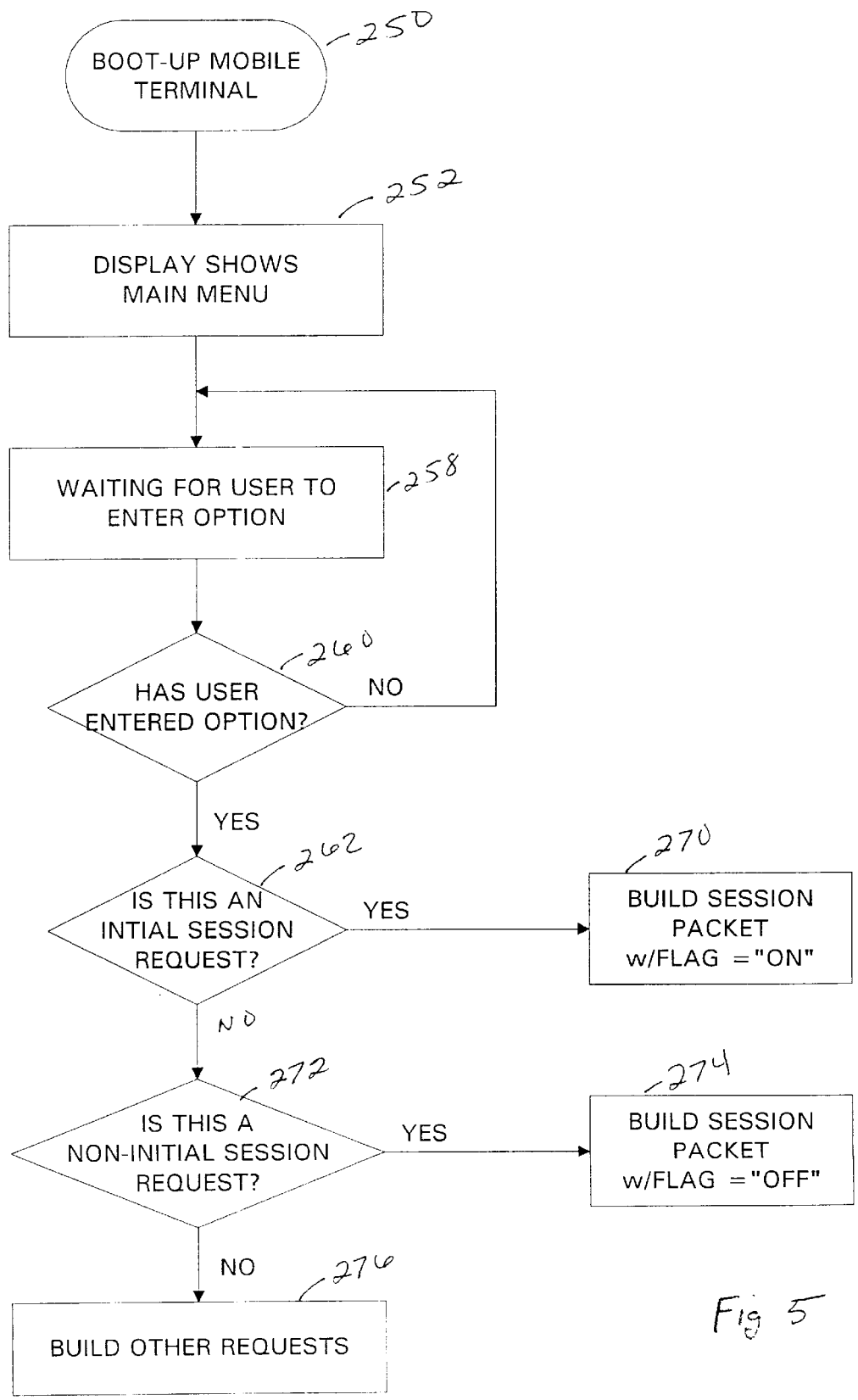
FIG. 5 is a flowchart suitable for programming the operation of a mobile communication unit in order to register with a base station in accordance with the present invention.

FIG. 5 illustrates the operation of each mobile communication unit 66 with respect to registering with different base stations 54 when, for example, roaming from cell to cell or registering with the network backbone 52 via a session request in accordance with the invention. In step 250, the mobile communication unit 66 is initially powered up (e.g., the mobile communication unit 66 is turned "on" via a switch). Alternatively, the mobile communication unit 66 may be powered up in the sense that it is reset in step 250. In step 250, the mobile communication unit 66 goes through any self-initialization routines and the like that may be desired. Following step 250, the processor 130 (FIG. 3) in the mobile communication unit 66 proceeds to step 252 in which the processor 130 activates the display 136 to display a main menu of features executable by the mobile communication unit 66. Next, the process proceeds to step 258 where the processor 130 awaits only instructions from the user input device 132. In step 260, the processor determines if the user has entered an option. If the user has not entered an option, the process returns to the beginning of step 258. If the user has entered an option, the processor 130 moves to step 262 where it determines if an initial registration or session has been requested. If the request is an initial registration or session request, the process advances to step 270 where a registration or session packet is generated with the flag field 220 (FIG. 4B) set to "ON". Thus, the flag being set to "ON" is indicative of an initial session request being submitted by the mobile communication unit 66 to the network backbone 52 via a base station 54. If in step 262 the processor 130 determines that an initial registration or session has not been requested, the processor 130 proceeds to step 272 where it determines if a non-initial registration or session request has been requested. If yes, the process moves to step 274 where the processor 130 builds a registration or session packet where the flag field 220 is set to "OFF" indicative of a non-initial session request. If in step 272 the processor 130 determines that a non-initial session has not been requested, the process advances to step 276. In step 276, the processor 130 builds other requests in accordance with the options selected by the user from the main menu.

Figure 6:
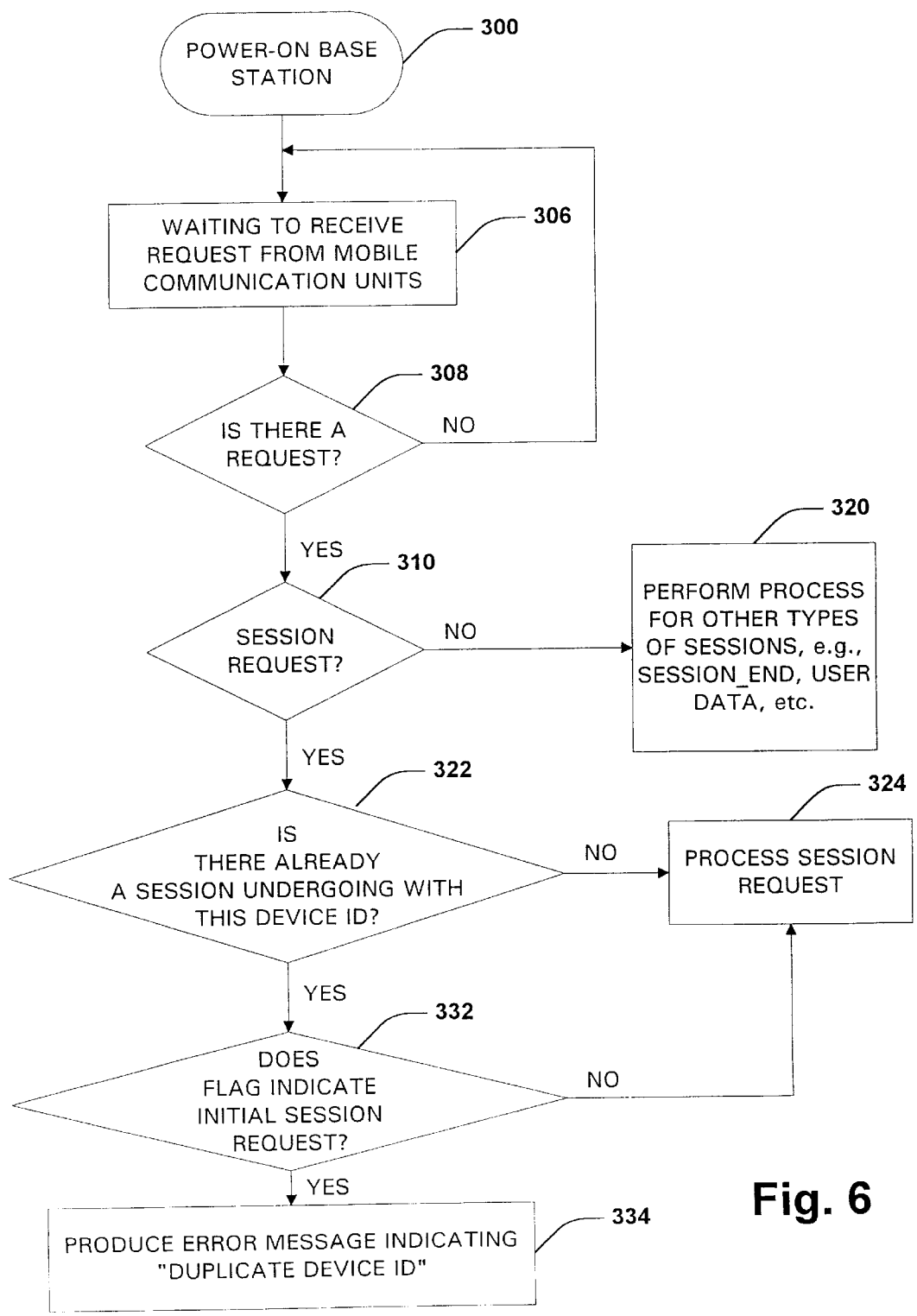
FIG. 6; is a flowchart suitable for programming the operation of a base station to produce an error message indicating a mobile communication unit is attempting to register with a duplicate ID in accordance with the present invention.

Referring now to FIG. 6, the procedure according to which the host computer 60 may receive session requests from the mobile communication units 66 via one of the base stations 54 is shown. It should be noted, however, that this procedure could easily apply to the mobile communication unit 66 registering to a base station or access point. After the host computer 60 has been connected to the network backbone 52, the host computer 60 is powered up initially in step 300. Such powering up can be as a result of turning on a switch, plugging in the host computer 60 power cord to a power source, etc.

After the general power-on procedures have been performed, the processor 103 moves to step 306 where it waits to receive requests from mobile communication units 66. In step 308, the processor 103 determines if a request has been made. If no, the processor 103 returns to step 306. If yes (a request has been made), the processor 103 advances to step 310 where the processor 103 determines if an initial session request is being made. If an initial session request has not been made, the processor 103 in step 320 performs the process corresponding to the session type (e.g., session-end, user data, etc.).

If in step 310 a session request has been made, the processor 103 proceeds to step 322 where the processor 103 determines if a session is already established in the system 50 with a mobile communication unit 66 and the host computer 60 under the same apparent device ID as the mobile communication unit 66 currently already making the session request in step 310.

In order to determine whether a device with a particular ID is currently registered to communicate over the network backbone 52, the processor 103 within the host computer 60 maintains an initial request table 340 (See FIG. 7) of all such mobile communication units. The table 340 can store up to "n" number of mobile communication units 66 and their "m" respective identifications codes. For example, as seen in FIG. 7, mobile communication unit$_1$ has an identification code of 0001, mobile communication unit$_2$ has an identification code of 0002, etc. More particularly, as shown by the table 340, each time a mobile communication unit initially requests a session via one of the base stations 54, the processor 103 within the host computer 60 enters the ID associated with the particular mobile communication unit 66 into the table 340. The mobile communication unit 66 entered into the table will then only be cleared from the table 340 when the host computer receives an end session request from the same mobile communication unit 66. If, prior to the end session packet being received by the host computer, a mobile communication unit 66 sends a session request packet to the host computer having an initial request flag set to "yes", then the processor 103 within the host computer 60 will assume such a mobile communication unit 66 is a duplicate device and handle the situation accordingly as will now be described.

If in step 322, it is determined that no prior session existed with this device ID, the processor 103 moves to step 324 where the processor 103 processes the session request. If yes, the processor 103 in step 322 proceeds to step 332 where the processor 103 determines if the flag field 220 (FIG. 4B) indicates an initial session request. For example, if the flag field 220 is set to "ON" this may indicate that this is an initial session request. If no, (e.g., flag field 220 set to "OFF") the processor 103 moves to step 324 where it processes the session request. If in step 332 the processor 103 determines from the flag field 220 that an initial session request has been made, the processor 103 produces an error message indicating that a mobile communication unit 66B is attempting to register with an ID apparently duplicate to an ID of a mobile communication unit 66A already registered to the network backbone 52.

In response to the error message, the mobile communication unit 66B attempting to register with an apparent duplicate ID is denied registration to the network backbone 52.

Although the invention has been shown and described with respect to the processor 103 of the host computer 60 making the determination of a mobile communication unit 66B attempting to register with an apparent duplicate ID, it is understood that the a processor other than processor 103 may be employed to make the determination. For example, a processor that is part of the base station 54 could be employed to accomplish the determination of a mobile communication unit 66B attempting to register with an apparent duplicate ID, and refusing registration to the network backbone 52 by that mobile communication unit 66B. Furthermore, a processor associated with a dedicated network device programmed to detect duplicate device IDs in accordance with this invention could also be used.

Referring now to FIG. 8, a flow diagram illustrating an exemplary method for responding to two devices having apparent duplicate identification codes within the same communication system is shown. In this flow diagram, there is a first mobile communication unit 350 and a second mobile communication unit 352. Both mobile communication units 350 and 352 have the same apparent identification code (e.g., ID=3) and thus possess a potential problem to the communication system 50. Initially, in step 360, the first mobile communication unit submits a session request or registration request to the host computer/base station 362 (ie., either the host computer 60 or an base station 54 configured to handle such requests) or other network devices configured to operate according to the present invention. The session request packet sent by the first mobile communication unit 350 to the host computer/base station 362 includes the identification code (ID=3) as well as the flag field 220 set to "ON".

In response, in step 362, the host computer/base station 362 acknowledges the initial session request of the first mobile communication unit 350 and registers the first mobile communication unit 350 to the network backbone 52. Thus, the first mobile communication unit 350 is registered to the network backbone 52. Next, the second mobile communication unit 352 in step 366 submits a session request to the host computer/base station 362. The session request packet sent by the second mobile communication unit 352 to the host computer/base station 362 includes the identification code (ID=3) as well as the flag field 220 set to "ON". As a result, the second mobile communication unit 352 is attempting to initially register to the network backbone 52 with the same apparent identification code (ID=3) as the first mobile communication unit 350. In response, the host computer/base station 362 in step 368 responds negatively to the initial session request of the second mobile communication unit 352. The host computer/base station 362 refuses registration to the network backbone 52 by the second mobile communication unit 352. As a result, by refusing registration to the second mobile communication unit 352 having the same identification code (ID=3) as the first mobile communication unit 350, the first mobile communication unit 350 is prevented from being dumped from the network backbone 52. Furthermore, lock-up of the entire communication system 50 due to two mobile communication units 350 and 352 having the same apparent identification code is prevented.

Steps 380 and 382 involve the situation when after the first mobile communication unit 350 has initially registered to the network backbone 52 and desires to re-register to the network backbone in order to carry out a particular process or continue communicating with the backbone 52. Such a re-registration may, for example, be needed if the mobile communication unit is accidently deregistered or dumped from the network. In step 380, the first mobile communication unit 350 submits a session request via a packet. The packet includes the identification code (ID=3) of the first mobile communication unit 350 and its flag field 220 which is now set to "OFF". The flag field 220 being set to "OFF" indicates to the host computer/base station 362 that this session request is not an initial session request and thus not another mobile communication unit (e.g., the second mobile communication unit 352). Accordingly, the host computer/base station 362 responds in the affirmative in step 382 and permits re-registration of the first mobile communication unit 350 to the network backbone 52 so that additional processes may be carried out. This same protocol could also be used with respect to mobile communication units attempting to register with a particular base station as should be appreciated.

Although the invention has been shown and described with respect to certain preferred embodiments, it is obvious that equivalents and modifications will occur to others skilled in the art upon the reading and understanding of the specification. For example, the present invention has been described with respect to a particular level of detection of mobile communication units 54 attempting to register to the network backbone 52 with the same apparent identification codes. In particular, the present embodiment utilizes the device identification field 218 and flag field 220 setting to determine if another mobile communication unit 54 is attempting to register to the network backbone 52 with a duplicate identification codes. However, it is to be understood that other fields as well as additional levels of detection fall within the scope of this invention. For instance, additional fields can be employed in the determination process to distinguish from a first mobile communication unit 350 attempting to re-register to the network backbone 52 and a second mobile communication unit 352 (having the same ID as the first) attempting to register to the network backbone 52. Moreover, additional steps can be employed in the determination process to distinguish from a first mobile communication unit 350 attempting to re-register to the network backbone 52 and a second mobile communication unit 352 (having the same apparent ID as the first) attempting to register to the network backbone 52.

Furthermore, it is to be understood that the present invention is not limited to two mobile communication units 66 having duplicate identification codes. Rather, it is understood that the scope of the present invention is intended to include the situation where two mobile communication units 66 do not have the same identification code but that it is apparent to the network backbone 52 that the two mobile communication units 66 have duplicate identification codes. For example, noise introduced to or corruption of the network backbone 52 may result in the network backbone seeing two particular mobile units 66 as having duplicate identification codes even though they do not. Accordingly, it is understood that the present invention is intended to address this situation and prevent registration to the network backbone by a particular mobile unit 66 which is attempting to register with an apparent duplicate identification code.

Moreover, it is also understood that the present invention is intended to address the situation where a mobile communication unit 66 has registered to the network backbone 52 with its flag field 220 set to "ON", and then re-attempts to register to the network backbone 52 with its flag field still set to "ON". In such a situation, the present invention could determine that such an invent has occurred by utilizing an additional field to identify to the network 52 that the mobile communication unit 66 is not a second unit but rather the original unit 66 with an incorrectly set flag field 220. Also, it is understood that the present invention may be used to configure the system 50 so that the network backbone 52 does not process the second request thereby maintaining the integrity of the original session.

The present invention includes all such equivalents and modifications.

What is claimed is:

1. A method of controlling registration of a mobile communication unit of a plurality of mobile communication units to a communication network including the steps of:

building a session packet for a first mobile communication unit with a flag set to "ON" if the session request is an initial request or setting the flag to "OFF" otherwise;

receiving a session request from the first mobile communication unit;

determining if the session request of the first mobile communication unit is an initial session request;

determining a mobile communication unit identification code of the first mobile communication unit;

registering the first mobile communication unit to the network;

receiving a session request from a second mobile communication unit;

determining a mobile communication unit identification code of the second mobile communication unit;

determining if the mobile communication unit identification code of the second mobile communication unit is an apparent duplicate of the mobile communication unit identification code of the first mobile communication unit; and refusing registration to the second mobile communication unit if the mobile communication unit identification code of the second mobile communication unit is an apparent duplicate of the mobile communication unit identification code of the first mobile communication unit.

2. The method of claim 1, further including the step of determining if the session request of the first mobile communication unit is not an initial request via its flag setting, and permitting re-registration of the first mobile communication unit to the communication network if the session request is not an initial session request.

3. The method of claim 1, wherein the first mobile communication unit is the same as the second mobile communication unit.

* * * * *

UNITED STATES PATENT AND TRADEMARK OFFICE
CERTIFICATE OF CORRECTION

PATENT NO.: 6,069,877

DATED: May 30, 2000

INVENTOR(S): Ming-Chung Yang

It is certified that error appears in the above-identified patent and that said Letters Patent is hereby corrected as shown below:

At column 6, line 41: please replace "668" with --66B--.

Signed and Sealed this

Twenty-fourth Day of April, 2001

Attest:

NICHOLAS P. GODICI

Attesting Officer     Acting Director of the United States Patent and Trademark Office